Jan. 26, 1954  W. P. BIGLER ET AL  2,667,263
FLEXIBLE FLIGHT FOR CHAIN CONVEYERS
Filed Feb. 20, 1953

INVENTORS
WILLIAM P. BIGLER
BY JOSEPH G. BIGLER
Hudson, Boughton,
Williams, David & Hoffmann
ATTORNEYS Patented Jan. 26, 1954

2,667,263

UNITED STATES PATENT OFFICE 2,667,263

FLEXIBLE FLIGHT FOR CHAIN CONVEYERS

William P. Bigler, Gates Mills, and Joseph G. Bigler, Willoughby, Ohio

Application February 20, 1953, Serial No. 338,044

4 Claims. (Cl. 198—171)

This invention relates to improvements in flexible flights for chain conveyors, that is conveyors of the type in which the upper run of an endless chain travels over the surface of a trough or elongated open casing having side walls. Flights are attached at regular intervals to the chain and extend laterally in both directions therefrom for pushing bulk material along the trough toward the delivery end of the conveyor.

Various bulk materials, for example coal, limestone, gypsum, potash, bauxite and miscellaneous rock materials are commonly moved by such conveyors. Such materials frequently include some rather large chunks and there is consequently considerable likelihood that in the operation of conventional conveyors of this character having rigid flights the materials may become jammed in the conveyor, in which event breakage of flights is unavoidable. The effect is even more noticeable where some of the chain links are universal links and the conveyor is so constructed or adjusted as to require the chain to make turns in the horizontal direction.

One of the objects of the present invention is the provision of flights of such character that they are flexed when they encounter fixed obstacles or jammed materials, thus greatly reducing breakage of flights.

Another object is the provision of conveyor chains for the purpose stated wherein the flights are positioned between succeeding universal links, so that if the conveyor changes its course in order to make turns in the horizontal direction, placing strain upon the flights at those points, still the spring flights will yield sufficiently to avoid breakage.

Still another object is the provision of multiple leaf spring flights to provide greatest resilience at the outer ends of the flights while the butt ends where the greatest load occurs are strongly reinforced.

A further object is the provision of clamping and mounting means for the butt ends of the spring leaves, constituting with the leaves flight assemblies which may be mounted on the chain as units and may serve as chain side plates.

Figure 1:
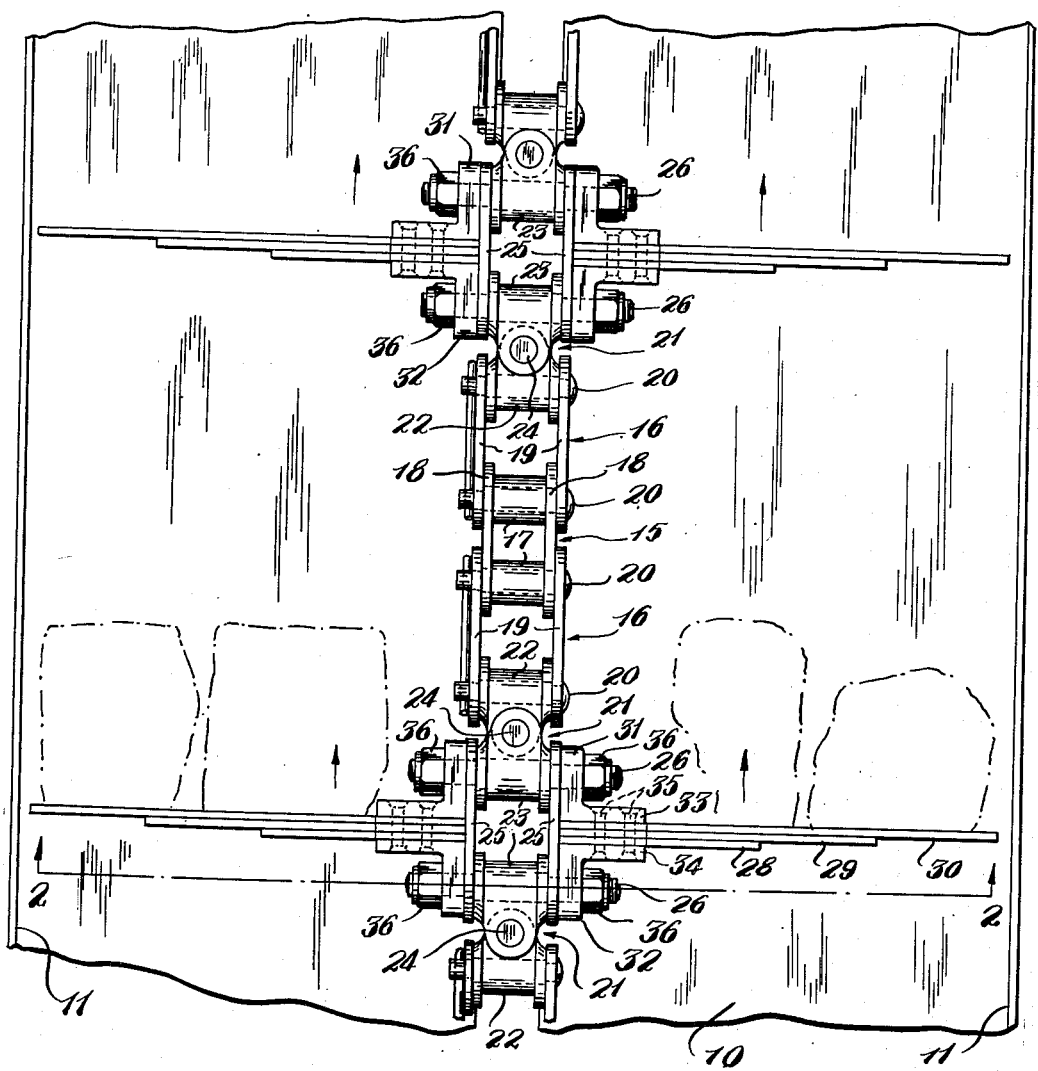
Figure 2:
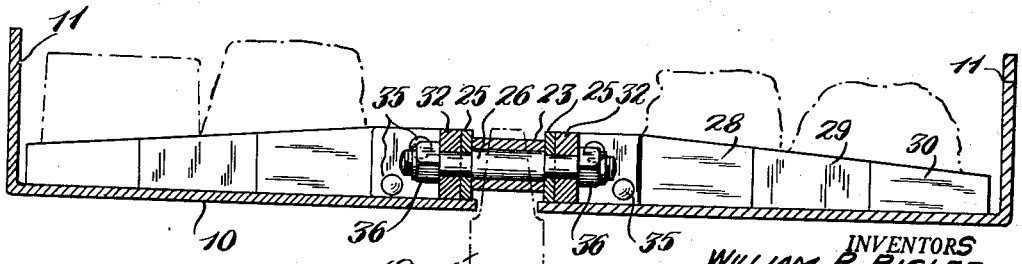

Other objects and features of novelty will appear as we proceed with the description of that embodiment of the invention which, for the purposes of the present application, we have illustrated in the accompanying drawing, in which Fig. 1 is a plan view of a fragment of a conveyor embodying the invention, and Fig. 2 is a vertical sectional view taken substantially on the line 2—2 of Fig. 1.

The conveyor of the invention comprises a flat bottomed trough 10 having side walls or rails 11. It should be understood that the length of the trough determines the length of the conveyor. At one end sprocket wheel 12 projects upwardly through a slot in the trough. This sprocket wheel is suitably power driven, preferably through reduction gearing from an electric motor, not shown, to advance an endless chain over the surface of trough 10. At the opposite end of the conveyor the chain runs over an idler sprocket (not shown), the lower run of the chain returning to sprocket 12 beneath the trough 10.

The chain may be made up primarily of roller links and connecting links, a roller link being shown at 15 and two connecting links at 16. Roller link 15 comprises two rollers 17 and two side plates or bars 18. The connecting links comprise side bars 19 and studs 20.

As shown in the drawing the chain may comprise at intervals pairs of universal links 21, each formed in two parts 22 and 23 connected by a pin or trunnion 24 which is disposed at right angles to the trough 10 over which the chain travels, and by virtue of which horizontal turns through limited angles may be made.

Between the parts 23 of adjacent universal links there are illustrated connecting plates 25 which have a close fit upon studs 26 and bear against shoulders formed on the studs by means of which accurate spacing of the links is attained while the parts 23 are left free to turn upon the studs.

The flights are preferably mounted to project laterally outward from the connecting plates 25. Each flight consists of a plurality, preferably 3, spring leaves, those shown being marked 28, 29 and 30. These leaves are made of high grade steel, heat treated. They are adapted to flex readily, the greater part of the flexure taking place of course toward the outer end of the flight. In order to accentuate this effect the upper edges of the leaves are inclined downwardly toward the outer end of the flight as illustrated in Fig. 2. Obviously the long leaf 30 which is also the foremost leaf is reinforced by the leaf 29 and both of the leaves 29 and 30 are reinforced by the short leaf 28.

The mounting for the butt ends of the spring leaves preferably comprises a pair of angle brackets having aligned legs 31 and 32 and outwardly extending legs 33 and 34. Between the latter legs the spring leaves are clamped and fastened by suitable means. As shown this means may consist of rivets 35 driven through registering holes in the brackets and in the spring leaves. The legs 31 and 32 of the brackets are drilled to take the studs 26, and nuts 36 are threaded onto the studs and turned down tightly against the legs 31 and 32. The holes in the legs 31 and 32 need not necessarily fit tightly the studs 26, since the latter are correctly spaced by the plates 25.

In some cases however, it may be desirable to omit the plates 25 and let the flight assemblies consisting of the brackets and spring leaves function to take the place of plates 25, that is the holes in the legs 31 and 32 may be accurately spaced and accurately sized so as to properly space the studs 26 of adjacent universal links.

Having thus described our invention, we claim:

1. In an endless chain conveyor for bulk material in which the upper run of the chain travels over a flat trough with side walls, said chain comprising a pair of spaced universal links, flights interposed between said universal links extending laterally on both sides of the chain, each of said flights comprising a plurality of juxtaposed spring leaves of graduated length disposed on edge with the shortest in the rear, the inner ends of said leaves being clamped between and fastened to a pair of brackets having divergent legs parallel to the direction of travel of the chain, studs connecting said universal links and said divergent legs, and nuts threaded onto said studs and bearing against said legs.

2. In an endless chain conveyor for bulk material in which the upper run of the chain travels over a trough, roller links and connecting links, and flights attached to and extending laterally in both directions from certain of said connecting links, each of said flights comprising a pair of angle brackets, one leg of each bracket bearing against the adjacent connecting link and the other legs of the two brackets extending outwardly in parallel spaced relation, a multiple leaf spring disposed on edge between and secured to the latter legs, the foremost leaf extending outwardly to the edge wall of the trough and the next leaf terminating short of the end of the foremost leaf.

3. A chain conveyor as defined in claim 2, wherein each flight comprises a series of juxtaposed spring leaves of graduated length with the shortest leaf in the rear.

4. A chain conveyor as defined in claim 3, wherein the lower edges of said leaves are parallel with the base of said trough and the upper edges incline downwardly and outwardly.

WILLIAM P. BIGLER.
JOSEPH G. BIGLER.

References Cited in the file of this patent

UNITED STATES PATENTS

| Number | Name | Date |
| --- | --- | --- |
| 1,571,536 | Wilson | Feb. 2, 1926 |
| 2,094,789 | Gellatly | Oct. 5, 1937 |